US009332623B2

United States Patent
Fukuda et al.

(10) Patent No.: US 9,332,623 B2
(45) Date of Patent: May 3, 2016

(54) HIGH-VOLTAGE DISCHARGE LAMP ILLUMINATION DEVICE

(71) Applicant: USHIO DENKI KABUSHIKI KAISHA, Tokyo (JP)

(72) Inventors: Minoru Fukuda, Himeji (JP); Atsushi Imamura, Himeji (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/417,764

(22) PCT Filed: Jul. 10, 2013

(86) PCT No.: PCT/JP2013/068899
§ 371 (c)(1),
(2) Date: Jan. 27, 2015

(87) PCT Pub. No.: WO2014/021071
PCT Pub. Date: Feb. 6, 2014

(65) Prior Publication Data
US 2015/0201481 A1    Jul. 16, 2015

(30) Foreign Application Priority Data

Aug. 1, 2012    (JP) .................................. 2012-171129

(51) Int. Cl.
| H01J 13/48 | (2006.01) |
| H05B 41/34 | (2006.01) |
| H05B 41/288 | (2006.01) |

(52) U.S. Cl.
CPC ............ *H05B 41/34* (2013.01); *H05B 41/2887* (2013.01); *Y02B 20/202* (2013.01)

(58) Field of Classification Search
CPC .............................. H05B 41/14; H05B 41/36

USPC .................................. 315/224, 291, 307, 326
See application file for complete search history.

(56) References Cited

U.S. PATENT DOCUMENTS

| 8,198,824 B2 * | 6/2012 | Yufuku | .............. H05B 41/2881 315/224 |
| 8,541,954 B2 * | 9/2013 | Saka | .................. H05B 41/2825 315/246 |

(Continued)

FOREIGN PATENT DOCUMENTS

| JP | 2011-210564 A | 10/2011 |
| WO | 2009/122678 A1 | 10/2009 |

OTHER PUBLICATIONS

Notification of Transmittal of Translation of the International Preliminary Report on Patentability and Translation of Written Opinion of the International Searching Authority; PCT/JP2013/068899; issued on Feb. 12, 2015.

(Continued)

*Primary Examiner* — Jason M Crawford
(74) *Attorney, Agent, or Firm* — Studebaker & Brackett PC

(57) ABSTRACT

A high-voltage discharge lamp illumination device comprises a pulse generation part which generates pulse waves, and a power supply part which receives a DC voltage and converts the DC voltage into the AC current in correspondence to a frequency of the pulse waves so as to supply the AC current to the lamp. The pulse generation part repeats a cycle of outputting a first pulse wave over a first period, and thereafter outputting a second pulse wave having a lower frequency than the first pulse wave over a second period shorter than the first period. The pulse generation part returns to the cycle after outputting a third pulse wave having a frequency which is further lower than the second pulse wave in place of the second pulse wave, at a predetermined timing.

4 Claims, 11 Drawing Sheets

(56) References Cited

U.S. PATENT DOCUMENTS

| | | | |
|---|---|---|---|
| 8,952,633 B2* | 2/2015 | Imamura | H05B 41/2887 315/224 |
| 2006/0170375 A1* | 8/2006 | Okamoto | H05B 41/2925 315/291 |
| 2006/0208664 A1* | 9/2006 | Okishima | H05B 41/2883 315/291 |
| 2008/0315782 A1* | 12/2008 | Hirao | H05B 41/2886 315/224 |
| 2010/0148686 A1* | 6/2010 | Arimoto | H05B 41/2883 315/246 |
| 2011/0025989 A1 | 2/2011 | Ono et al. | |
| 2011/0187288 A1* | 8/2011 | Horikawa | H05B 41/36 315/307 |
| 2012/0313546 A1* | 12/2012 | Imamura | H05B 41/2888 315/287 |

OTHER PUBLICATIONS

International Search Report; PCT/JP2013/068899; Sep. 10, 2013.
An Office Action; "Notification of Reasons for Refusal," issued by the Japanese Patent Office on Jul. 7, 2015, which corresponds to Japanese Patent Application No. 2012-171129 and is related to U.S. Appl. No. 14/417,764; with English language translation.

* cited by examiner

Fig.4

| Operation number | Time interval(sec) | Magnification tis |
|---|---|---|
| (15n-14) th | 13 | 7 |
| (15n-13) th | 10 | 6 |
| (15n-12) th | 5 | 5 |
| (15n-11) th | 5 | 4 |
| (15n-10) th | 5 | 3 |
| (15n-9) th | 5 | 2 |
| (15n-8) th | 5 | 2 |
| (15n-7) th | 5 | 2 |
| (15n-6) th | 5 | 2 |
| (15n-5) th | 5 | 2 |
| (15n-4) th | 5 | 3 |
| (15n-3) th | 5 | 4 |
| (15n-2) th | 5 | 5 |
| (15n-1) th | 5 | 6 |
| 15n th | 10 | 7 |
| Normal | | 1 |

Fig.7

| Operation number | Cumulative cycle number | Magnification tis |
|---|---|---|
| (11n-10) th | 50 | 5 |
| (11n-9) th | 100 | 6 |
| (11n-8) th | 150 | 7 |
| (11n-7) th | 200 | 8 |
| (11n-6) th | 250 | 9 |
| (11n-5) th | 300 | 10 |
| (11n-4) th | 350 | 9 |
| (11n-3) th | 400 | 8 |
| (11n-2) th | 450 | 7 |
| (11n-1) th | 500 | 6 |
| 11n th | 550 | 5 |
| Normal |  | 1 |

HIGH-VOLTAGE DISCHARGE LAMP ILLUMINATION DEVICE

TECHNICAL FIELD

The present invention relates to an illumination device of a high-voltage discharge lamp which is preferably used in a light source such as a projector.

BACKGROUND ART

A high-voltage discharge lamp is used as a lamp for a light source such as a projector, the high-voltage discharge lamp being configured such that 0.2 mg/mm$^3$ or more of mercury is sealed in an inside of a transparent glass discharge vessel and the pressure of the vessel is 200 atmosphere or higher at the lighting time. The light in a visible wavelength region can be obtained with a high output by making the mercury vapor pressure high.

FIGS. 10A and 10B each show a schematic sectional view of the high-voltage discharge lamp. FIG. 10B is a schematic sectional view obtained by enlarging the vicinity of a leading end of an electrode in FIG. 10A.

As shown in FIG. 10A, a high-voltage discharge lamp 10 has a light emitting part 11 which is formed by a discharge vessel and has a substantially spherical shape. A pair of electrodes 20a and 20b are arranged in the light emitting part 11 so as to be opposite to each other with an extremely small distance of 2 mm or less.

Further, sealing part 12 are formed at both ends of the light emitting part 11. Metal foils 13 for an electrical conduction are buried in an airtight manner in the sealing parts 12, and shaft parts (30a and 30b) of the electrodes 20a and 20b are bonded to one ends of the metal foils 13. Further, external leads 14 are bonded to the other ends of the metal foils 13, and power is supplied from a power supply part (not shown).

In the high-voltage discharge lamp 10 described above, protrusions 21 are formed respectively in tip side surfaces of a pair of electrodes 20a and 20b which are arranged in an opposite manner in the light emitting part 11 of the light emitting tube, during the lighting, and a discharge arc 22 is retained between the protrusions 21. As a result, a stable lighting state is maintained (refer to FIG. 11A).

On the other hand, in the case that the high-voltage discharge lamp 10 is lighted in the same state for a long period, a plurality of minute protrusions 23 may be formed due to a high temperature, or minute irregularities are generated in the tip surface of the electrodes (refer to FIG. 11B). The minute protrusions 23 and the irregularities are generated by the melting of a material (for example, tungsten) constituting the electrodes 20a and 20b, and the aggregation of a chemical compound generated by being bonded to gas which is sealed within the light emitting part 11, and this existence changes a shape of the surface of the tip of the electrode. It has been known that a starting point of an arc moves in conjunction with this, the discharge position becomes unstable, and an illuminance reduction and a flickering are generated.

In order to solve the problem described above, the following Patent Document 1 discloses an illumination system of a discharge lamp which supplies a current waveform of pulse waves P1 having a predetermined frequency (a fundamental frequency) to a high-voltage discharge lamp and which intermittently or periodically inserts a current waveform of pulse waves P2 having a lower frequency than the fundamental frequency to the pulse waves having the fundamental frequency (refer to FIG. 12). More specifically, the fundamental frequency is set to a frequency which is selected from a range between 60 and 1000 Hz, and the frequency having a lower frequency is set to a frequency which is selected from a range between 5 and 200 Hz. Further, the control is performed so as to increase or decrease the time for supplying the fundamental frequency little by little every predetermined time. In other words, this system changes the generation frequency of the pulse waves having the low frequency in response to the time.

A period that one electrode is fixed to an anode and the other electrode is fixed to a cathode, that is, a period that a high voltage is applied between both the electrodes becomes longer by setting the frequency of the pulse waves to the low frequency. As a result, a heating degree applied to the electrode is enhanced, and it is possible to transmit the heat not only to the tip of the electrode, but also to a position which is away from the tip. Therefore, the heat is transmitted to the position which is away from the tip of the electrode during the application of the pulse waves having the low frequency, and it is possible to melt and/or evaporate the minute protrusions or the irregularities which are generated at the positions. As a result, it is possible to eliminate the protrusions and the irregularities in the other positions than the tip of the electrode which may adversely affect, rather than the protrusions to be an arc starting point.

PRIOR ART DOCUMENT

Patent Document

Patent Document 1: JP-A-2011-210564

SUMMARY OF INVENTION

Problems to be Solved by the Invention

According to the illumination system described in the above Patent Document 1, it is possible to cause the unnecessary minute protrusions 23 except the protrusion 21 to eliminate as well as creating and maintaining only the protrusion 21 to be the arc starting point.

In the meantime, in the lamp which is recently used for a projector, an increase of brightness is requested according to market needs, and an input power to the lamp accordingly tends to be increased. Further, since the heat generated by the arc is increased in conjunction with the increase of the lamp power, a size itself of the electrode tends to be increased so as to secure a thermal capacity for satisfying a temperature condition.

Further, a new problem that the protrusion moves arises since the size of the electrode is enlarged. A description will be given of the problem with reference to FIGS. 1A to 1C.

FIG. 1A is a schematic sectional view obtained by enlarging the vicinity of a tip of an electrode in a state in which the discharge arc 22 is formed and the lighting state is stably maintained in the same manner as FIG. 11A.

As described above, in the case that the discharge maintains for the predetermined time, the minute protrusions 23 are formed in the periphery of the protrusion 21 coming to the starting point of the arc 22, by the reaggregation of the chemical compound including the component material (tungsten) of the electrodes 20a and 20b (refer to FIG. 1B). An area S in which any protrusion is not formed is increased in the tip surface of the electrode, particularly due to the increase of the electrode size. In other words, there is generated a state in which the minute protrusions 23 can be formed at the position which is further away from the tip of the electrode in comparison with the conventional structure. In the illumination control system described in Patent Document 1, it is impossible to supply the thermal energy which is necessary for melting and evaporating the minute protrusions 23 formed at the positions.

Further, since the region where the minute protrusions 23 can be formed is increased, there can be generated such a case that a plurality of minute protrusions 23 formed at close positions are combined and moved (refer to FIG. 1C).

The protrusion 21 maintaining the arc 22 does not always maintains the solid state, but may be molten its surface due to a high temperature. Further, since the minute protrusion 23 is small in volume, the minute protrusion is small in thermal capacity and is in an easily molting state. Accordingly, in the case that both the protrusion 21 maintaining the arc 22 and the minute protrusion 23 are in the melting state, they are combined by a force such as a surface tension, and the position of the protrusion 21 itself moves. As a result, the starting point of the arc 22 moves and the length of the arc 22 is elongated.

Comparing FIG. 1A with FIG. 1C, it is known that the protrusions 21 are not opposite completely to each other in FIG. 1C, and the arc 22 is accordingly formed in a diagonal direction. As a result, it is known that the length of the arc 22 is elongated in the state of FIG. 1C in comparison with the state of FIG. 1A. This causes the reduction of light collecting efficiency and brightness.

As a method of solving the problem described above, it is thought that the time for supplying an AC current having a low frequency is elongated so that the thermal energy reaches the position which is away from the tip of the electrode. However, in the case that the method is employed, the thermal energy supplied to the protrusion 21 becomes too large, and the protrusion 21 itself which is inherently necessary is molten and evaporated. As a result, the stable arc 22 cannot be maintained, and the method described above cannot be employed.

The present invention is made in view of the circumstances, and an object of the present invention is to achieve an illumination device of a high-voltage discharge lamp which can eliminate minute protrusions while maintaining a stable arc discharge even in the case that the minute protrusions are formed at a position which is away from a tip of an electrode in comparison with the conventional structure.

Means for Solving the Problems

A high-voltage discharge lamp illumination device according to the present invention is configured to supply an AC current to a high-voltage discharge lamp which has a pair of electrodes arranged in an opposite manner in a discharge vessel with a predetermined gas sealed, the high-voltage discharge lamp illumination device including:

a pulse generation part which generates pulse waves; and a power supply part which receives a DC voltage and converts the DC voltage into the AC current in correspondence to a frequency of the pulse waves so as to supply the AC current to the high-voltage discharge lamp.

Further, the pulse generation part repeats a cycle of outputting a first pulse wave over a first period, and thereafter outputting a second pulse wave having a lower frequency than the first pulse wave over a second period shorter than the first period, and returns to the cycle after outputting a third pulse wave having a frequency which is further lower than the second pulse wave in place of the second pulse wave, at a predetermined timing.

According to the configuration described above, the pulse generation part outputs the third pulse wave having the frequency which is further lower than the second pulse wave at the certain timing. Therefore, the voltage having a predetermined polarity is continuously applied from one electrode to the other electrode of the high-voltage discharge lamp over the time which is further longer than the time for which the second pulse wave is output. As a result, the electrode heating time is elongated in comparison with the time for which the second pulse wave is output, and it is possible to transmit the heat to a position which is away from the vicinity of the tip of the electrode where the voltage application during the output of the second pulse wave does not reach. As a result, it is possible to eliminate the minute protrusions which are formed at the position which is away from the protrusion coming to the starting point of the arc. Further, it is possible to prevent the matter that the protrusion coming to the starting point of the arc moves due to the combination of the minute protrusions with the protrusion coming to the starting point of the arc.

Further, since the present structure is configured such that the third pulse wave is output in place of the second pulse wave, the present structure does not remarkably enhance the generation incidence of the pulse waves (the second pulse wave and the third pulse wave) which have the lower frequency than the first pulse wave. As a result, there is no risk that the protrusion of the tip of the electrode which is necessary for the arc generation is heated excessively to be melted and eliminated. Thus, according to the present structure, it is possible to eliminate the minute protrusions which are formed in the periphery of the protrusion at the tip of the electrode or the position which is away from the protrusion at the tip of the electrode, while maintaining the protrusion at the tip of the electrode and keeping the stable arc discharge.

In addition to the above structure, the high-voltage discharge lamp illumination device according to the present invention may be configured such that the pulse generation part changes the frequency of the third pulse wave to a predetermined frequency every predetermined timing.

According to the structure described above, since the frequency of the third pulse wave is differentiated in response to the timing, the heating time applied to the electrode changes every timing. Therefore, since the region to which the heat is transmitted changes, it is possible to securely eliminate the minute protrusions which are formed at the various positions.

Here, the pulse generation part may be configured to detect the arrival of the predetermined timing in response to the elapsed time after starting the output of the pulse waves. Further, the pulse generation part may be configured to detect the arrival of the predetermined timing in response to the number of the cycle repeated after starting the output of the pulse waves.

Further, the frequency of the pulse waves which are output from the pulse generation part may be adjusted by a frequency control part.

In other words, the high-voltage discharge lamp illumination device according to the present invention may have a frequency control part which adjusts the frequency of the pulse waves is provided in addition to the above structure, and the frequency control part repeats a control of setting a first frequency which is a frequency of the first pulse wave over the first period and continuously setting a second frequency which is a frequency of the second pulse wave over the second period, and carries out a control of setting the third frequency in place of the second frequency in the case of detecting the arrival of the predetermined timing on the basis of the elapsed time after starting the output of the pulse waves or the switching number of the first period and the second period.

Further, the high-voltage discharge lamp according to the present invention is configured such that a pair of electrodes are arranged in an opposite manner in the discharge vessel with a predetermined gas sealed, and the AC current is supplied from the high-voltage discharge lamp illumination device having the feature described above, whereby the discharge is generated between the pair of electrodes so as to light.

Effect of the Invention

According to the structure of the present invention, even in the case that the minute protrusions are formed at the position which is away from the tip of the electrode in comparison with the conventional structure, it is possible to eliminate the minute protrusions while maintaining the stable arc discharge. Further, it is possible to obtain an effect that the matter that the protrusion coming to the starting point of the arc moves can be avoided due to the combination of the minute protrusions with the protrusion coming to the starting point of the arc.

BRIEF DESCRIPTION OF THE DRAWINGS

FIG. 4 is a table showing an output time of a pulse wave P3 by a rate with an output time of a pulse wave P2, every timing of outputting the pulse wave P3;

FIG. 7 is another table showing the output time of the pulse wave P3 by the rate with the output time of the pulse wave P2, every timing of outputting the pulse wave P3;

DESCRIPTION OF EMBODIMENTS

Figure 1A:
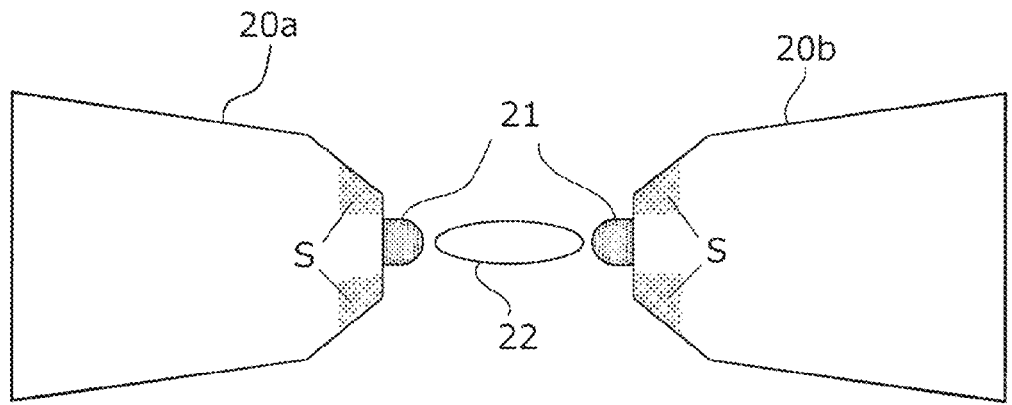
FIG. 1A is a schematic sectional view obtained by enlarging the vicinity of a tip of an electrode in a state in which a discharge arc is formed and a lighting state is stably maintained, in a high-voltage discharge lamp.

A description will be given of an embodiment of a high-voltage discharge lamp illumination device according to the present invention with reference to the accompanying drawings. A dimensional ratio of the drawing does not necessarily coincide with an actual dimensional ratio in each of the drawings.

Further, the high-voltage discharge lamp illumination device according to the present invention can be particularly used for a lighting control of a discharge lamp having a larger size electrode than the conventional one, as described later. However, it can be used for a discharge lamp having an electrode of conventional size, and the present invention does not exclude the use aspect described above.

[Structure of Lamp]

Figure 10A:
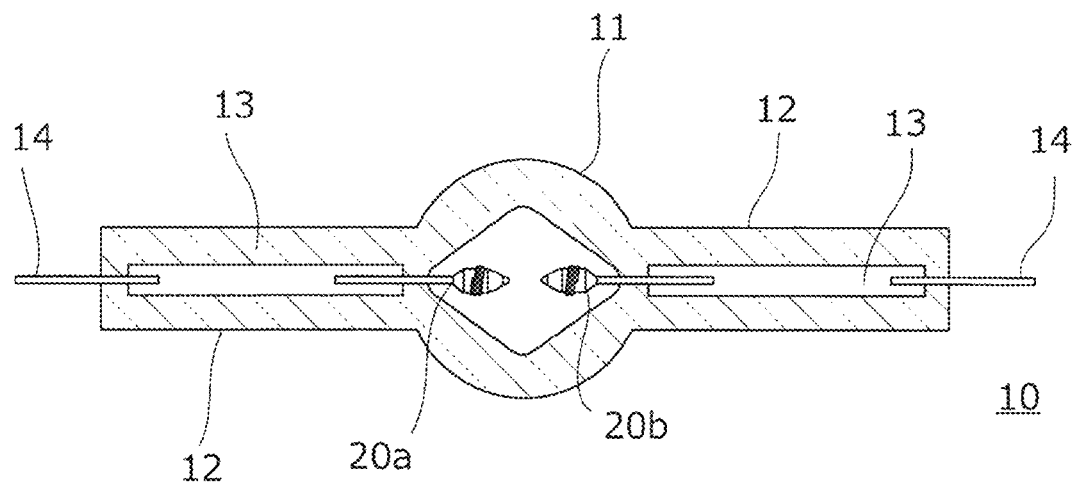
FIG. 10A is a schematic sectional view of a high-voltage discharge lamp.

Since a structure itself of the lamp is the same as that of FIGS. 10A and 10B, a description will be given below with reference to these drawings. As described above, the size of the electrode may be enlarged.

A high-voltage discharge lamp 10 has a light emitting part 11 which is formed by a discharge vessel formed of quartz glass and has a substantially spherical shape. A material of the discharge vessel is not limited to quartz glass, but the discharge vessel may be formed of other materials.

A pair of electrodes 20a and 20b are arranged in an opposite manner in the light emitting part 11 at an extremely small distance, for example, 2 mm or less.

Further, sealing parts 12 are formed at both ends of the light emitting part 11. Metal foils 13 for electrical conduction made of molybdenum are buried in an airtight manner in the sealing parts 12, for example, by a shrink seal. Shaft parts of the electrodes 20a and 20b are bonded to one ends of the metal foils 13, and external leads 14 are bonded to the other ends of the metal foils 13, whereby the power is supplied from the high-voltage discharge lamp illumination device according to the present invention described later.

Mercury, rare gas, and halogen gas are sealed in the light emitting part 11 of the high-voltage discharge lamp 10 according to the present embodiment.

The mercury is provided for obtaining radiant light having a necessary visible light wavelength, for example, a wavelength between 360 and 780 nm, and in terms of figures, an amount of 0.20 mg/mm$^3$ or more is sealed. The sealed amount is differentiated depending on temperature conditions, however, achieves a high vapor pressure, that is, a pressure in an inside of the light emitting part being 200 atmosphere or more at the lighting time. Further, it is possible to form the high-voltage discharge lamp having the high mercury vapor pressure, that is, the mercury vapor pressure being 250 atmosphere or more and 300 atmosphere or less at the lighting time, by sealing the mercury furthermore, and the higher mercury vapor pressure can achieve a light source which is suitable for the projector.

For example, argon gas is sealed as the rare gas at about 13 kPa. The function of the rare gas is to improve a lighting starting performance.

Further, iodine, bromine or chlorine is sealed as the halogen gas in a form of a chemical compound with mercury or other metal. A sealed amount of the halogen is selected from a range between 10$^{-6}$ vol/mm$^3$ and 10$^{-2}$ vol/mm$^3$. The biggest reason for sealing the halogen is to obtain a long service life of the discharge lamp by utilizing a so-called halogen cycle. Further, the structure which is extremely compact and has an extremely high lighting vapor pressure such as the high-voltage discharge lamp 10 according to the present invention can obtain an action of preventing devitrification of the discharge vessel by charging the halogen. The devitrification means that a crystallization makes progress from a metastable glass state, and changes to an aggregation of crystal grains which are grown from a lot of crystal nuclei. If the phenomenon described above is created, light is scattered by a grain boundary of the crystal and the discharge vessel becomes opaque.

In the present invention, the gas sealed in the light emitting part 11 is not limited to the gas described above as long as the gas can achieve the same function.

An practical example of the high-voltage discharge lamp 10 can be configured such that the maximum outer diameter of the light emitting part is 9.4 mm, a distance between the electrodes is 1.0 mm, an internal volume of the discharge vessel is 55 mm$^3$, a rated voltage is 70 V, a rated power is 180 W and the power is supplied in an AC system.

Further, the high-voltage discharge lamp 10 is supposed to be embedded in a projector which is promoted to be downsized, is requested to be extremely downsized in its whole dimension, and is also required to have a high intensity of light emission on the other hand. As a result, a thermal influence within the light emitting part becomes extremely severe, and a bulb wall loading value of the lamp is 0.8 to 2.5 W/mm$^2$, specifically 2.4 W/mm$^2$. Since the high-voltage discharge lamp 10 having the high mercury vapor pressure and the bulb wall loading value is mounted to a presentation device such as a projector and an overhead projector as described above, it is possible to provide radiant light having a good color rendering property for the presentation device.

[Shape of Tip of Electrode]

Figure 10B:
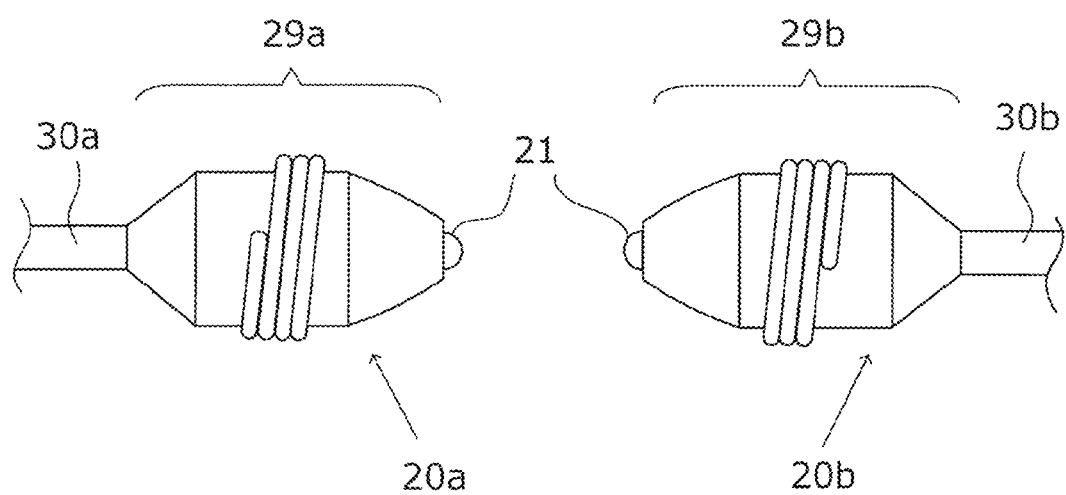
FIG. 10B is a schematic sectional view obtained by enlarging the vicinity of the tip of the electrode of the high-voltage discharge lamp.
Figure 11A:
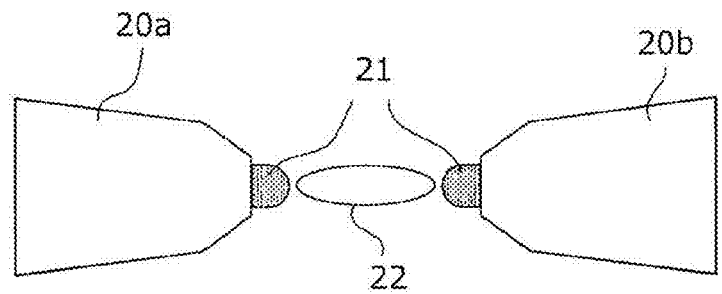
FIG. 11A is a schematic sectional view obtained by enlarging the vicinity of the tip of the electrode in a state in which the discharge arc is formed and the lighting state is stably maintained.
Figure 11B:
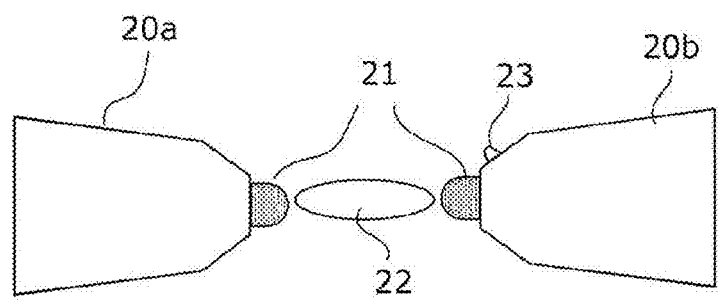
FIG. 11B is a schematic sectional view obtained by enlarging the vicinity of the tip of the electrode in a state in which the minute protrusions are formed at other positions than the tip of the electrode.

As shown in FIG. 10B, the electrode 20$a$ is configured by a head part 29$a$ and a shaft part 30$a$, and the electrode 20$b$ is configured by a head part 29$b$ and a shaft part 30$b$. Further, a protrusion 21 is formed in a tip of each of the electrode 20$a$ and the electrode 20$b$. The protrusion 21 is formed by aggregation of an electrode material which is molten at the tip of the electrode at the lamp lighting time. In the present embodiment, the description is given on the assumption that each of the electrode 20$a$ and the electrode 20$b$ is formed of tungsten, however, the material is not limited to this.

In the case that power distribution is applied to the electrode 20$a$ and the electrode 20$b$, the electrodes 20$a$ and 20$b$ become incandescent so as to become high temperatures, and the tungsten configuring the electrodes 20$a$ and 20$b$ sublimes. The sublimed tungsten is combined with the sealed halogen gas in an inner wall surface area of the light emitting part 11 where is under comparatively low temperature, and forms halogenated tungsten. Since a vapor pressure of the halogenated tungsten is comparatively high, the halogenated tungsten removes to the vicinity of the tips of the electrode 20$a$ and the electrode 20$b$ in a gas state. Further, the halogenated tungsten is separated into halogen and tungsten by being reheated at this position. Among them, the tungsten returns to the tips of the electrode 20$a$ and the electrode 20$b$ so as to be aggregated, and the halogen comes back to the halogen gas within the light emitting part 11. This is called as a halogen cycle. Here, in the case that the aggregated tungsten is attached to the vicinity of the tips of the electrode 20$a$ and the electrode 20$b$, the protrusions 21 are formed.

Figure 1B:
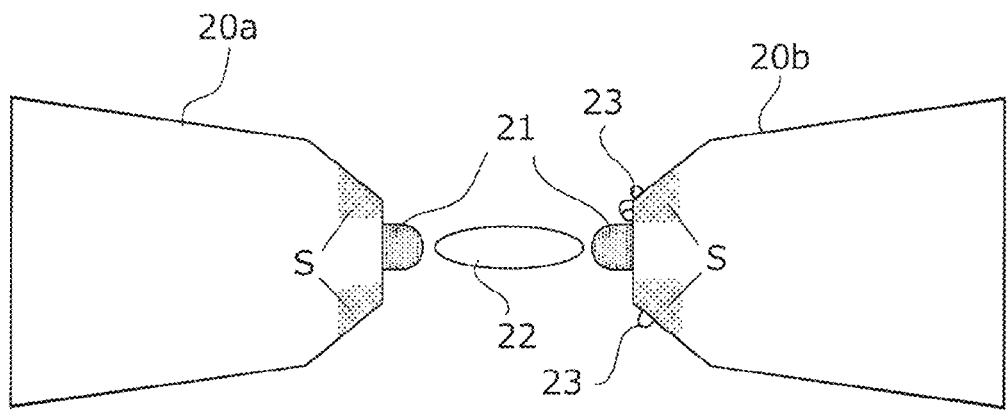
FIG. 1B is a schematic sectional view obtained by enlarging the vicinity of the tip of the electrode in a state in which minute protrusions are formed at positions away from the tip of the electrode, in the high-voltage discharge lamp.
Figure 1C:
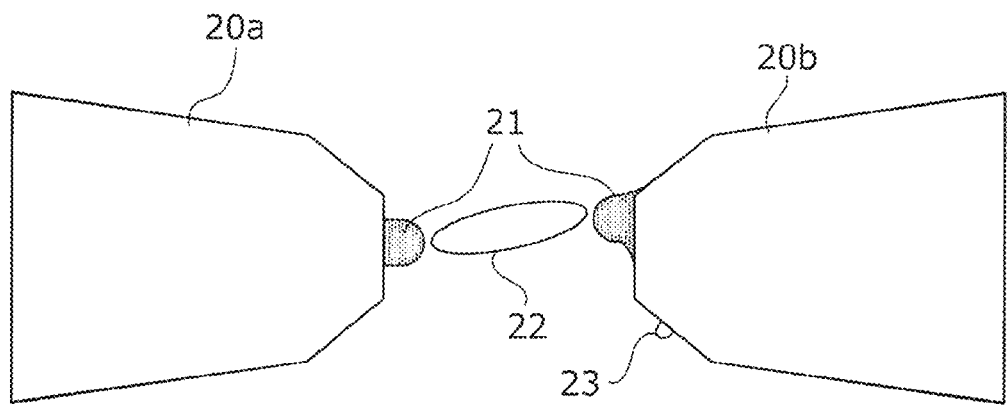
FIG. 1C is a schematic sectional view obtained by enlarging the vicinity of the tip of the electrode in a state in which the tip of the electrode moves by combining with the minute protrusions, in the high-voltage discharge lamp.

Since the area S to which the tungsten aggregated from the halogenated tungsten can be attached is increased by the enlargement of the size in the electrodes as described above, the minute protrusions 23 are formed at the position which is greatly away from the protrusions 21 coming to the starting point of the arc 22 (refer to FIG. 1B). A description will be given below of a structure of the illumination device according to the present invention which can eliminate the minute protrusions 23 while leaving the protrusions 21 coming to the starting point of the arc 22.

[Structure of Illumination Device]

Figure 2:
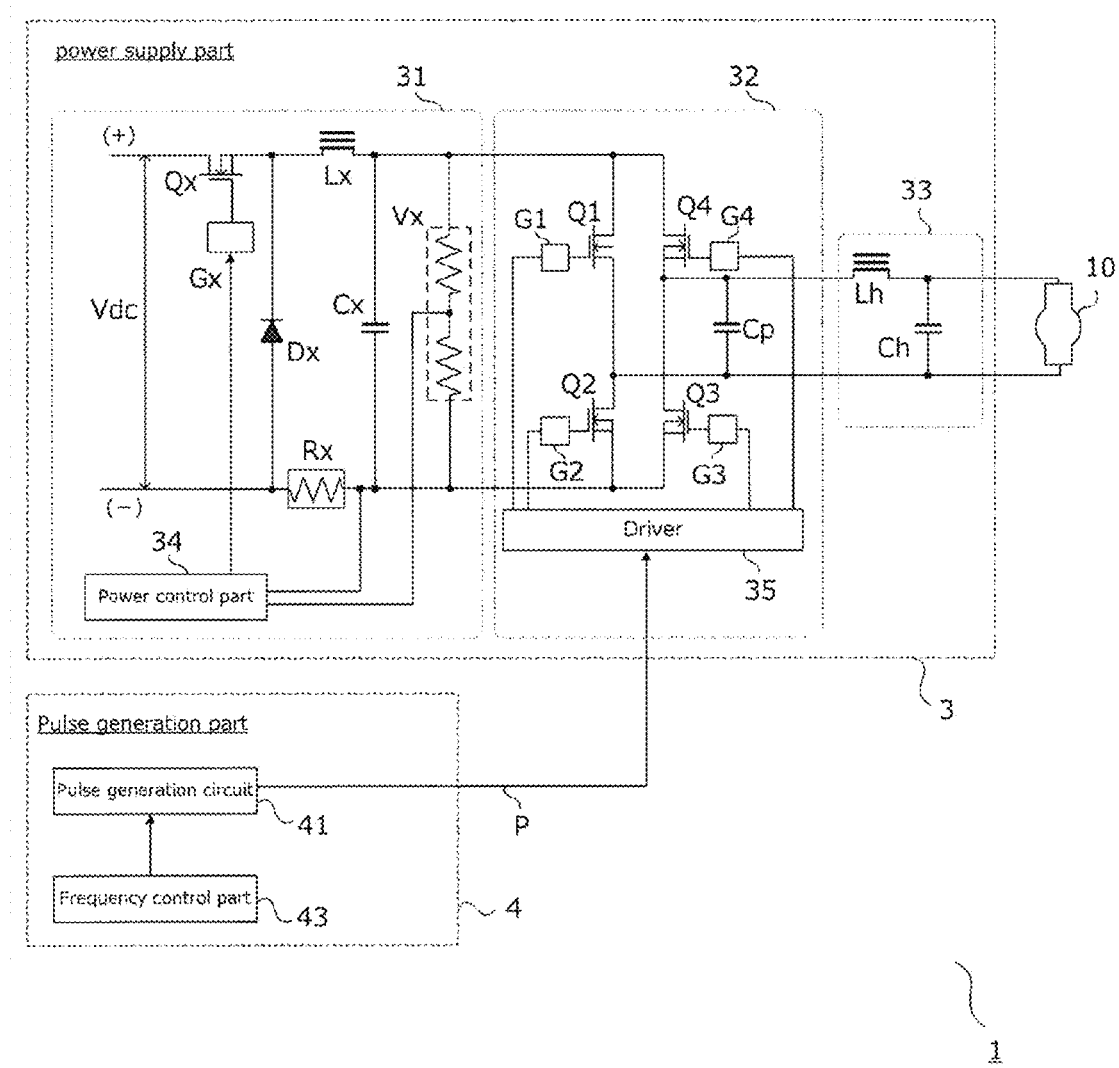
FIG. 2 is a circuit block diagram schematically showing a structure of a high-voltage discharge lamp illumination device.

FIG. 2 is a circuit block diagram schematically showing a structure of the high-voltage discharge lamp illumination device according to the present invention. As shown in FIG. 2, an illumination device 1 is configured by a power supply part 3 and a pulse generation part 4. An AC current created by the power supply part 3 in response to pulse waves P which are output from the pulse generation part 4 is supplied to the high-voltage discharge lamp 10. As a result, the high-voltage discharge lamp 10 is lighted.

<Power Supply Part>

The power supply part 3 is provided with a step-down chopper part 31, a DC/AC conversion part 32, and a starter part 33.

The step-down chopper part 31 steps down a supplied DC voltage Vdc to a desired low voltage, and outputs the voltage to the DC/AC conversion part 32 in the latter stage. In FIG. 2, the step-down chopper part 31 is shown as a specific structure example by a structure having a switching element Qx, a reactor Lx, a diode Dx, a smoothing capacitor Cx and a resistance Rx.

The switching element Qx is configured such that one end is connected to a positive side power terminal to which the DC voltage Vdc is supplied, and the other end is connected to one end of the reactor Lx. The diode Dx is configured such that a cathode terminal is connected to a junction point of the switching element Qx and the reactor Lx, and an anode terminal is connected to a negative side power terminal. The smoothing capacitor Cx is configured such that one end is connected to an output side terminal of the reactor Lx, and the other end (negative side terminal) is connected to an output side terminal of the resistance Rx. The resistance Rx is connected between one side terminal of the smoothing capacitor Cx and an anode terminal of the diode Dx, and achieves a function of detecting the current.

The switching element Qx is driven by a gate signal Gx output from a power control part 34. In accordance with a duty of the gate signal Gx, the step-down chopper part 31 steps down the input DC voltage Vdc to the voltage in response to the duty so as to output to the DC/AC conversion part 32 in the latter stage.

The DC/AC conversion part 32 converts the input DC voltage into the AC voltage having a desired frequency, and outputs to the starter part 33 in the latter stage. In FIG. 2, the DC/AC conversion part 32 is shown as a specific structure example by the structure configured by switching elements Q1 to Q4 connected in a bridge (a full bridge circuit).

The switching element Q1 is driven by a gate signal G1 output from a driver 35. In the same manner, the switching element Q2 is driven by a gate signal G2, the switching element Q3 is driven by a gate signal G3, and the switching element Q4 is driven by a gate signal G4. The driver 35 outputs the gate signal to a combination of the diagonally arranged switching elements Q1 and Q4 and a combination of the switching elements Q2 and Q3 so as to alternately repeat on and off. As a result, the AC voltage having a rectangular waveform is generated between the junction point of the switching elements Q1 and Q2, and the junction point of the switching elements Q3 and Q4.

The starter part 33 has a circuit for boosting the AC voltage supplied from the DC/AC part 32 at the starting time of the high-voltage discharge lamp so as to supply to the high-voltage discharge lamp 10. In FIG. 2, the starter part 33 is shown as a specific structure example by the structure configured by a coil Lh and a capacitor Ch. A high voltage which is necessary for starting the discharge lamp is generated in a secondary side of the starter part 33 by applying the AC voltage of a high switching frequency (for example, several hundreds of kHz) in the vicinity of a resonance frequency of an LC series circuit configured by a coil Lh and a capacitor Ch from the DC/AC part 32 at the starting time of the high-voltage discharge lamp, and the high voltage is supplied to the high-voltage discharge lamp 10. After the lighting of the high-voltage discharge lamp, a steady-state lighting action is carried out by transferring the frequency of the AC voltage supplied from the DC/AC part 32 to a steady frequency (for example, 60 to 1000 Hz). The steady frequency corresponds to a frequency of pulse waves P1 described later.

In the circuit described above, the change of the frequency of the AC voltage supplied to the starter part 33 can be achieved by adjusting the cycle of switching the on-off between the combination of the switching elements Q1 and Q4 in the DC/AC part 32, and the combination of the switching elements Q2 and Q3. Further, a change of a crest value of the AC voltage supplied to the starter part 33 can be achieved by adjusting an action duty of the switching element Qx in the step-down chopper part 31.

In other words, the switching element Qx of the step-down chopper part 31 is turned on and off in accordance with the switching frequency in response to the duty of the gate signal Gx output from the power control part 34, whereby the power supplied to the high-voltage discharge lamp 10 is changed. For example, in the case that the supply power to the high-voltage discharge lamp 10 is needed to be raised, the power control part 34 performs the control of lowering the duty of the gate signal Gx so as to achieve a desired power value.

<Pulse Generation Part>

The pulse generation part 4 is provided with a pulse generation circuit 41 and a frequency control part 43, and outputs the generated pulse signal P to the driver 35 of the DC/AC part 32. The switching control applied to the switching elements Q1 to Q4 of the DC/AC part 32 is performed on the basis of the pulse signal as described above.

The pulse generation circuit 41 generates a pulse signal having a frequency designated by the frequency control part 43. The frequency control part 43 may be also configured by a microcomputer together with the power control part 34 described above.

Figure 3A:
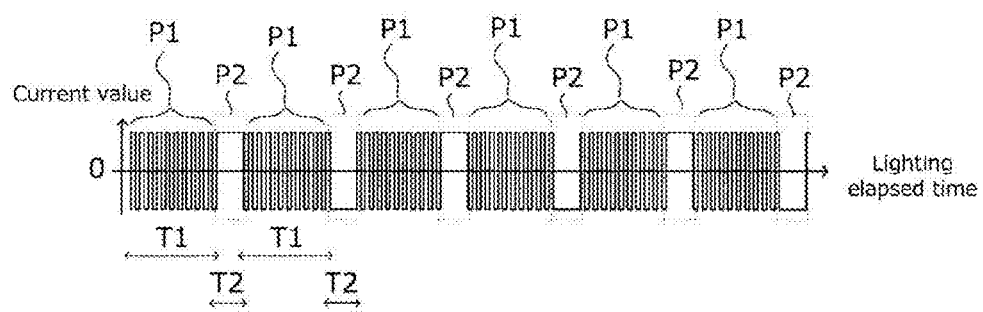
FIG. 3A is a view showing an example of a lamp current waveform of the high-voltage discharge lamp according to the present invention in a certain time zone.
Figure 3B:
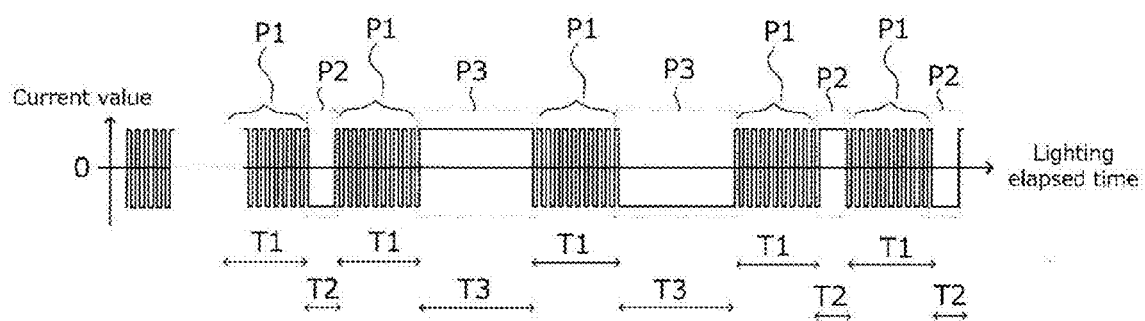
FIG. 3B is a view showing an example of a lamp current waveform of the high-voltage discharge lamp according to the present invention in the other certain time zone.

A description will be in detail given below of the frequency of the pulse signal P which is output from the pulse generation part 4, with reference to FIGS. 3A and 3B. FIGS. 3A and 3B are views showing waveforms of the pulse signals P which are respectively output from the pulse generation part 4 in different time zones, that is, an example of a lamp current waveform of the high-voltage discharge lamp 10.

Figure 12:
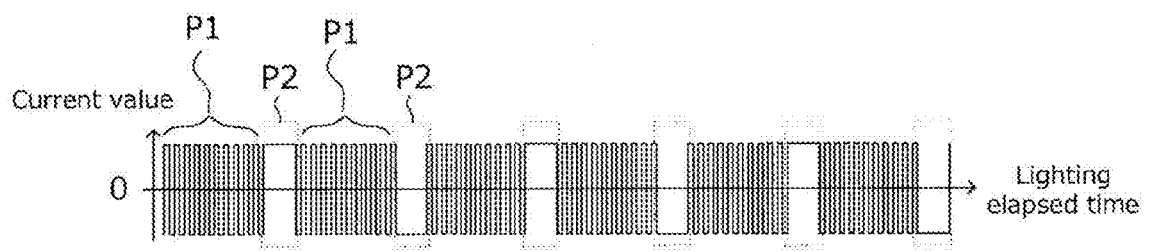
FIG. 12 is a view showing an example of a conventional lamp current waveform.

The pulse generation part 4 according to the present invention outputs pulse waves which are similar to the pulse waveforms described above with reference to FIG. 12, in the time zone which outputs a waveform shown in FIG. 3A. More specifically, in the period, there is repeated a cycle of outputting a pulse wave P1 (corresponding to "first pulse wave") having a fundamental frequency for a predetermined period T1, and thereafter outputting a pulse wave P2 (corresponding to "second pulse wave") having a lower frequency than the fundamental frequency for a predetermined period T2 which is shorter than the period T1.

The frequency (the fundamental frequency) of the pulse wave P1 corresponds to a fundamental frequency at the steadily lighting time of the high-voltage discharge lamp 10, and is a frequency which is selected from the range between 60 and 1000 Hz. Further, the pulse wave P2 is a low frequency which is intermittently inserted after the elapse of the period T1, and its frequency is a frequency which is selected from the range between 5 and 200 Hz and which is lower than the fundamental frequency.

The pulse wave P2 is preferably inserted at a time interval of 0.01 seconds or more and 120 seconds or less. In other words, the period T1 is preferably set to a range of 0.01 seconds or more and 120 seconds or less. The period T1 is more preferably set to a range of 0.01 seconds or more and 2 seconds or less. If the pulse wave P2 is inserted at a shorter time interval than 0.01 seconds, the protrusion 21 coming to the starting point of the arc is overheated, so that there is a risk that the shape of the protrusion 21 is deformed or the protrusion 21 may be eliminated in some cases. On the contrary, if the time interval is elongated too much, the state in which the minute protrusions are continuously formed at the peripheral positions of the protrusions 21 is maintained for a long time, so that there is a risk that an arc having a starting point with the minute protrusions is formed in this period.

In the example of FIG. 3A, the period T2 in which the pulse wave P2 is output is set to a period which is a half cycle of the pulse wave P2. In other words, the output of the pulse wave P2 is fixed to any of the positive polarity and the negative polarity within the period T2.

Further, the pulse generation part 4 according to the present invention outputs a pulse wave P3 (corresponding to "third pulse wave") having a further lower frequency in place of the pulse wave P2 having the low frequency, at a predetermined timing, and thereafter comes back to the cycle described above. FIG. 3B shows a waveform of a time zone which includes a time outputting the pulse wave P3.

In the example of FIG. 3B, a period T3 in which the pulse wave P3 is output is set to a period which is a half cycle of the pulse wave P3, in the same manner as the pulse wave P2. In other words, an output of the pulse wave P3 is fixed to any of the positive polarity and the negative polarity within the period T3.

In other words, the pulse wave P output from the pulse generation part 4 in the present embodiment has the pulse wave P1 in which the positive polarity and the negative polarity are repeated under the fundamental frequency over the period T1, the pulse wave P2 which is fixed to the value of the positive polarity or the negative polarity over the period T2, and the pulse wave P3 which is fixed to the value of the positive polarity or the negative polarity over the period T3. Further, the pulse wave P3 has the frequency which is further lower than the pulse wave P2. In other words, the period T3 fixed to any of the positive polarity and the negative polarity is set to be longer than the period T2 in the pulse wave P2.

The pulse generation part 4, first of all, outputs the pulse wave P1 having the fundamental frequency over the period T1, and thereafter outputs the pulse wave P2 having the low frequency over the period T2 which is the half cycle of the pulse wave P2. Thereafter, the pulse generation part 4 again outputs the pulse wave P1 having the fundamental frequency over the period T1, and thereafter outputs the pulse wave P2 having the low frequency over the period T2 which is the half cycle of the pulse wave P2, in a fixed state with the opposite polarity to the last pulse wave P2. The cycle described above is repeated hereinafter.

Further, the pulse generation part 4 outputs the pulse wave P3 having the further low frequency, that is, having a long cycle in place of the pulse wave P2 over the period T3 which is a half cycle of the pulse wave P3, under a certain timing. FIG. 3B shows a pulse waveform in a state in which the pulse wave P3 fixed to the positive polarity and the just after pulse wave P3 fixed to the negative polarity are output from the pulse generation part 4, in place of the pulse wave P2 fixed to the positive polarity and the just after pulse wave P2 fixed to the negative polarity. Thereafter, the pulse waveform returns to the cycle of the pulse wave P1 and the pulse wave P2.

Further, the pulse generation part 4 according to the present embodiment changes the frequency of the pulse wave P3 which is output in place of the pulse wave P2, in accordance with the timing. FIG. 4 is a table showing the output time of the pulse wave P3 by a rate to the output time of the pulse wave P2, per timing outputting the pulse wave P3. In FIG. 4, reference symbol n denotes natural number.

According to an example shown in FIG. 4, the pulse generation part 4 outputs a pulse wave P3 having a septupled wavelength (a seventh part of frequency) to the pulse wave P2 in place of the pulse wave P2 over a half cycle of the pulse wave, that is, over a period T3 (=7T2), after the elapse of thirteen seconds from the start of the output of the first pulse wave P. Thereafter, the pulse generation part 4 comes back to the repeat of the output of the pulse wave P1 over the period T1 and the output of the pulse wave P2 over the period T2.

Next, after the elapse of ten seconds from the preceding output of the pulse wave P3, the pulse generation part 4 outputs a pulse wave P3 having a sextuplicated wavelength (a sixth part of frequency) to the pulse wave P2 in place of the pulse wave P2 over a half cycle of the pulse, that is, over a period T3 (=6T2). Thereafter, the pulse generation part 4 comes back to the repeat of the output of the pulse wave P1 over the period T1 and the output of the pulse wave P2 over the period T2. Hereinafter, the frequency of the pulse wave P generated from the pulse generation part 4 is changed in the same manner on the basis of the table shown in FIG. 4.

More specifically, the pulse generation part 4 is configured to output the pulse wave P3 having a lower frequency in place of the pulse wave P2 in response to the predetermined timing and to change the frequency per timing.

Figure 5A:
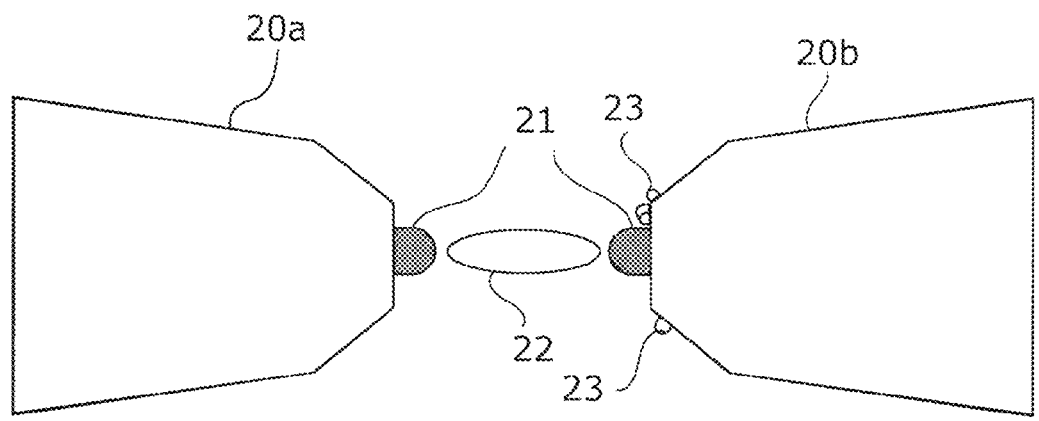
FIG. 5A is a view schematically showing a state of a heat transmission to the vicinity of the tip of the electrode in a state in which a pulse wave P1 is output.
Figure 5B:
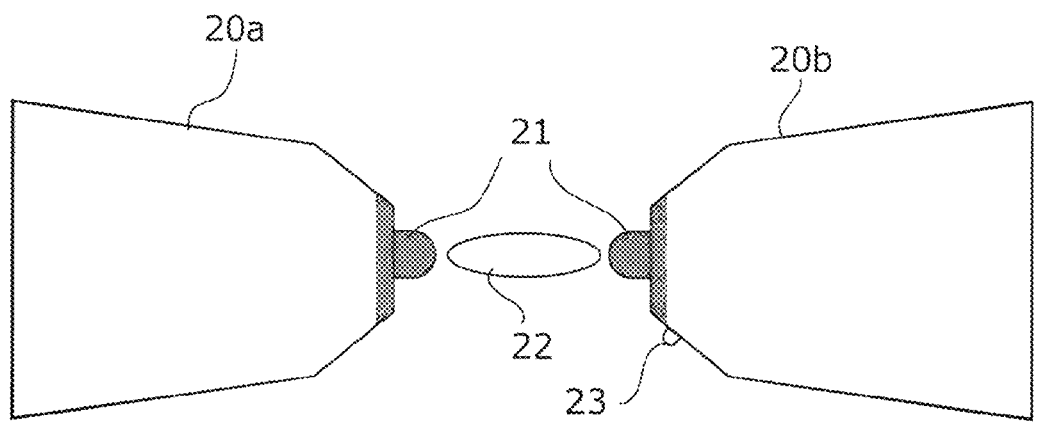
FIG. 5B is a view schematically showing a state of the heat transmission to the vicinity of the tip of the electrode in a state in which the pulse wave P2 is output.
Figure 5C:
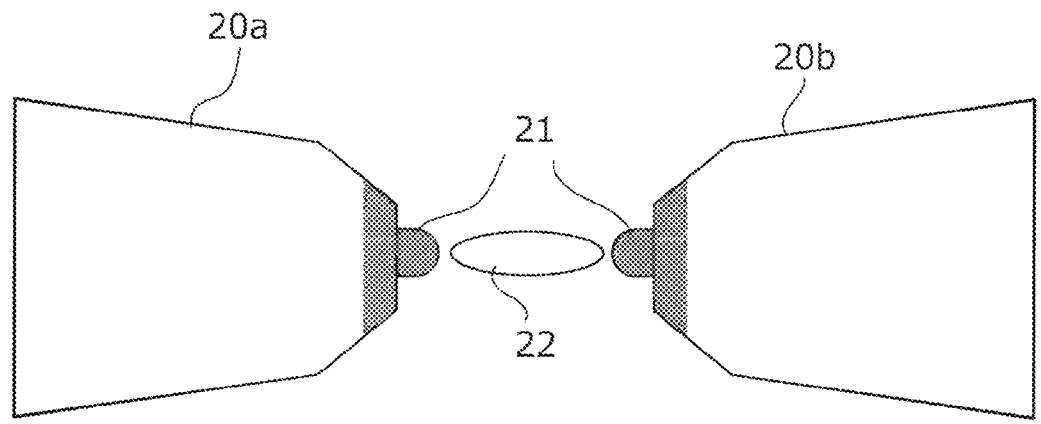
FIG. 5C is a view schematically showing a state of the heat transmission to the vicinity of the tip of the electrode in a state in which the pulse wave P3 is output.

FIGS. 5A, 5B and 5C are views schematically showing states of heat transmission to the vicinity of the tip of the electrodes in the case that the pulse waves P generated from the pulse generation parts 4 are P1, P2 and P3, respectively. In each of the drawings, densely daubed portions indicate areas to which the heat is transmitted.

As described above, as long as the pulse wave P1 having a standard frequency f1 at the normal lighting action is output, heat is transmitted to the protrusions 21 coming to the starting points of the arc 22 for a short time. As a result, the heat is not transmitted to the peripheral area, and the minute protrusions 23 are formed at the peripheral position of the protrusions 21 or the positions which are away from the protrusions 21 (refer to FIG. 5A).

As long as the pulse wave P2 having a frequency f2 which is lower than the standard frequency f1 is output (the period T2), the positive and negative of the voltage applied between two electrodes 21 of the high-voltage discharge lamp 10 is not inverted. As a result, during the period T2, the voltage having a predetermined polarity is continuously applied from one electrode to the other electrode. Accordingly, the heating area is enlarged, the heat is also transmitted to the peripheral positions of the protrusions 21, and the minute protrusions 23 formed at these positions are sublimed so as to be eliminated. However, since the heat is not transmitted to the positions which are away from the protrusions 21, the minute protrusions formed at the positions are still left (refer to FIG. 5B).

Further, as described above, according to the structure of the present invention, since the pulse generation part 4 outputs the pulse wave P3 at a certain timing, the voltage having the predetermined polarity is continuously applied from the one electrode to the other electrode over the period T3 which is further longer than the period T2. Since the time for which the pulse wave P3 is applied is longer than the application time of the pulse wave P2, the heating time of the electrodes is elongated, and it is possible to transmit the heat to the positions which are away from the vicinity of the tips of the electrodes which the application of the pulse wave P2 does not reach. As a result, it is possible to eliminate the minute protrusions 23 which are formed at the positions away from the protrusions 21 (refer to FIG. 5C).

Further, according to the structure of the present invention, since the frequency of the pulse wave P3 is differentiated in response to the timing, the heating time applied to the electrodes changes. Therefore, since the area to which the heat is transmitted changes, it is possible to securely eliminate the minute protrusions 23 which are formed at the various positions, and it is possible to avoid the movement of the protrusions 21 due to the combination with the minute protrusions 23.

Figure 6A:
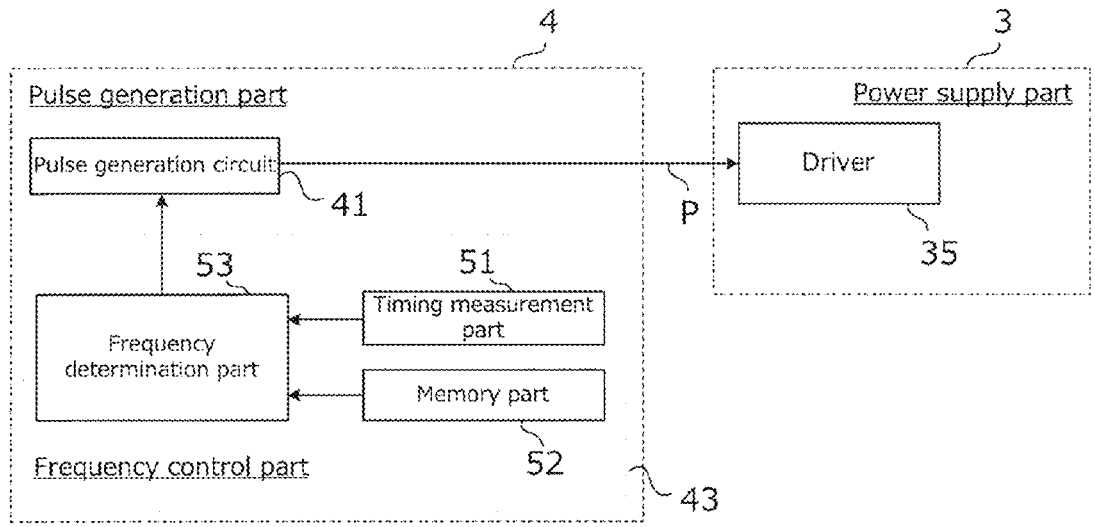
FIG. 6A is a block diagram schematically showing an example of one configuration of a frequency control part.

The frequency control part 43 controls the frequency so as to output the pulse waves as referred in FIGS. 3A and 3B from the pulse generation circuit 41. FIG. 6A is a block diagram schematically showing a structure example of the frequency control part 43. As shown in FIG. 6A, the frequency control part 43 is provided with a timing measurement part 51, a memory part 52, and a frequency determination part 53.

The timing measurement part 51 corresponds to a timer which measures the elapsed time from the start of the output of the pulse wave. The memory part 52 is configured, for example, by a ROM, and stores information of the frequency f1 of the pulse wave P1, information of the continuous output time T1 of the pulse wave P1, information of the frequency f2 of the pulse wave P2, information of the continuous output time T2 of the pulse wave P2, and various information relating to the data table shown in FIG. 4. The frequency determination part 53 carries out an operation based on the information relating to the elapsed time given from the timing measurement part 51, and the information stored in the memory part 52, and determines the frequency of the pulse wave P so as to output the resultant to the pulse generation circuit 41. According to the example in FIGS. 3A and 3B, the time T2 is set to a half cycle length of the pulse wave P2.

The frequency determination part 53, first of all, sets the pulse generation circuit 41 so as to output the pulse wave having the frequency f1 at the pulse generation starting time. Next, in the case of detecting the elapse of the time T1 on the basis of the information from the timing measurement part 51, the frequency determination part 53 sets so as to read the frequency f2 of the pulse wave P2 stored in the memory part 52 and output the pulse wave of the frequency f2. Further, in the case of detecting the elapse of the time T2 on the basis of the information from the timing measurement part 51, the frequency determination part 53 sets so as to read the frequency f1 of the pulse wave P1 stored in the memory part 52 and again output the pulse wave of the frequency f1. The frequency control part 43 repeats the control described above.

Further, in the case of detecting the elapse of the predetermined time described in the data table on the basis of the information from the timing measurement part 51, the frequency determination part 53 sets so as to read the frequency f3 of the pulse wave P3 corresponding to the timing from the data table stored in the memory part 52 and output the pulse wave of the frequency f3.

The information relating to the frequency f3 of the pulse wave P3 is described by the rate to the frequency f2 of the pulse wave P2 in the data table shown in FIG. 4, however, may be described by the value itself of the frequency f3.

<Other Structure Example of Frequency Control Part>

Figure 6B:
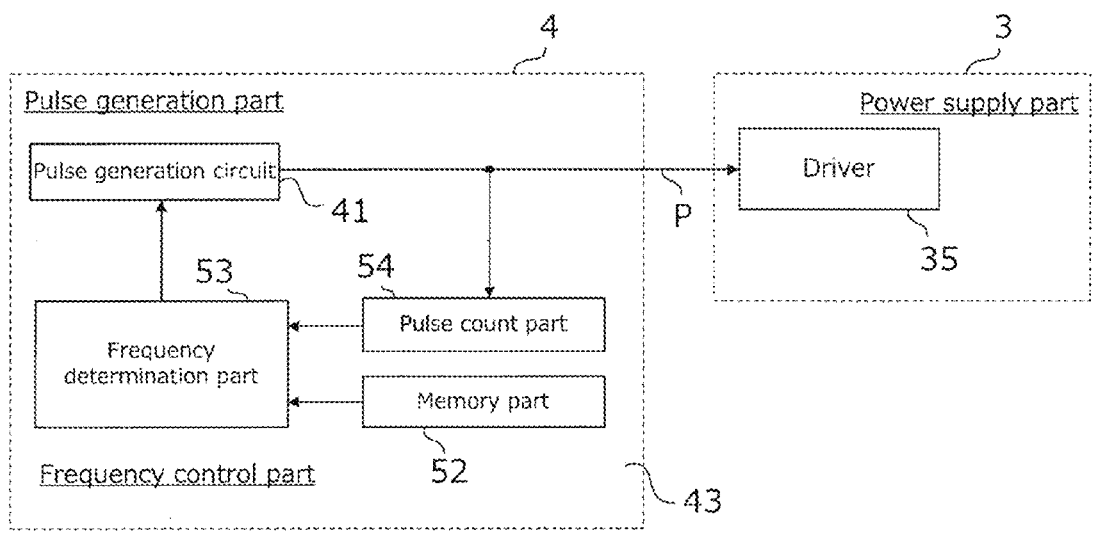
FIG. 6B is a block diagram schematically showing an example of another configuration of the frequency control part.

The embodiment described above is configured such that the frequency control part 43 controls so as to change the frequency according to the elapsed time from the pulse generation, however, another method may be employed. FIG. 6B is a block diagram schematically showing another structure example of the frequency control part which is different from FIG. 6A.

A frequency control part 43 shown in FIG. 6B has a pulse count part 54 in place of the timing measurement part 51. The pulse waves P output from the pulse generation circuit 41 are input to the pulse count part 54, and the pulse count part 54 measures a wave number and a cycle number. Here, the wave number is a value obtained by dividing a total wave number of the pulse waves continuously output from a certain time by a cycle length, and corresponds how many cycle of waves are output. Further, the cycle number indicates a combination number in the case that the combination of the pulse wave P1 and the pulse wave P2 is assumed to one cycle.

In the present structure, the memory part 52 stores information of the frequency f1 of the pulse wave P1, information of the continuous output wave number N1 of the pulse wave P1, information of the frequency f2 of the pulse wave P2, information of the continuous output wave number N2 of the pulse wave P2, and various information relating to a data table shown in FIG. 7. FIG. 7 is a table showing the output time of the pulse wave P3 by a rate to the output time of the pulse wave P2 per timing outputting the pulse wave P3 in the same manner as FIG. 4. The data table in FIG. 7 is different from FIG. 4, and shows an output timing of the pulse wave P3 by a cycle number in place of the elapsed time from the start of the output of the pulse wave.

According to the example shown in FIG. 7, the pulse generation part 4 outputs the pulse wave P3 having a quintupled wavelength (a fifth part of frequency) in place of the pulse wave P2 over a half cycle of the pulse wave, that is, over the time T3 (=5T2), after the elapse of fifty cycles from the start of the first output of the pulse wave P, that is, after repeating fifty times of combination of the pulse wave P1 and the pulse wave P2. Thereafter, the pulse generation part 4 comes back to the repeat of the output of the pulse wave P1 over the time T1 and the output of the pulse wave P2 over the time T2.

Next, the pulse generation part 4 outputs the pulse wave P3 having a sextuplicated wavelength (a sixth part of frequency) in place of the pulse wave P2 over a half cycle of the pulse wave, that is, over the time T3 (=6T2), after the elapse of one hundred of cycles from the preceding output of the pulse wave P3, that is, one hundred of repeats of the combination of the pulse wave P1 and the pulse wave P2. Thereafter, the pulse generation part 4 comes back to the repeat of the output of the pulse wave P1 over the time T1 and the output of the pulse wave P2 over the time T2. Hereinafter, the frequencies of the pulse waves P generated from the pulse generation part 4 are changed in the same manner on the basis of the table shown in FIG. 7.

The frequency determination part 53, first of all, sets the pulse generation circuit 41 to output the pulse wave of the frequency f1 at the pulse generation starting time. Next, in the case of detecting the output of the continuous N1 waves of the pulse wave P1 on the basis of the information from the pulse count part 54, the frequency determination part 53 sets so as to read the frequency f2 of the pulse wave P2 stored in the memory part 52 and output the pulse wave of the frequency f2. Further, in the case of detecting the output of the continuous N2 waves of the pulse wave P2 on the basis of the information from the timing measurement part 51, the frequency determination part 53 sets so as to read the frequency f1 of the pulse wave P1 stored in the memory part 52 and again output the pulse wave of the frequency f1. The frequency control part 43 hereinafter repeats the control described above.

Further, in the case of detecting the elapse of a predetermined cycle number described in the data table on the basis of the information from the pulse count part 54, the frequency determination part 53 sets to read the frequency f3 of the pulse wave P3 corresponding to the timing from the data table stored in the memory part 52 and sets to output the pulse wave of the frequency f3.

According to the example in FIGS. 3A and 3B, N2 is set to one half. Further, the cycle number may be configured such that the current cycle number is certified by the number of times that the frequency of the pulse wave P is set to the frequency f2 in the frequency determination part 53.

<Other Structure Example of Pulse Generation Part>

According to the embodiment described above, the pulse wave P1, the pulse wave P2, and the pulse wave P3 are all output from the same pulse generation circuit 41. On the contrary, the pulse generation part 4 may have a first pulse generation circuit which generates the pulse wave P1 having the frequency f1, and a second pulse generation circuit which generates the pulse wave P2 having the frequency f2 individually, and may switch the circuit generating the pulse wave between the first and second pulse generation circuits in the stage reaching a set continuous time elapse or continuous output wave number.

In this case, the same pulse wave P1 having the frequency f1 is always generated from the first pulse generation circuit. Further, the frequency of the pulse wave output from the second pulse generation circuit is changed to the frequency f3 corresponding to the timing from f2 at the time point when the timing described in the time table shown in FIG. 4 or 7 arrives, and is thereafter reset to the frequency f2 again.

The pulse generation part 4 may be provided with a processing part which elongates the pulse length at a designated multiple number, in the latter stage of the second pulse generation circuit. In this case, the multiple number of elongation is set to one-fold in the processing part, and is set to the multiple number corresponding to the timing at the time point when the timing described in the time table arrives. According to the structure, the respective pulse waves having the fixed frequencies can be output from the first and second pulse generation circuits.

Examples

Figure 8:
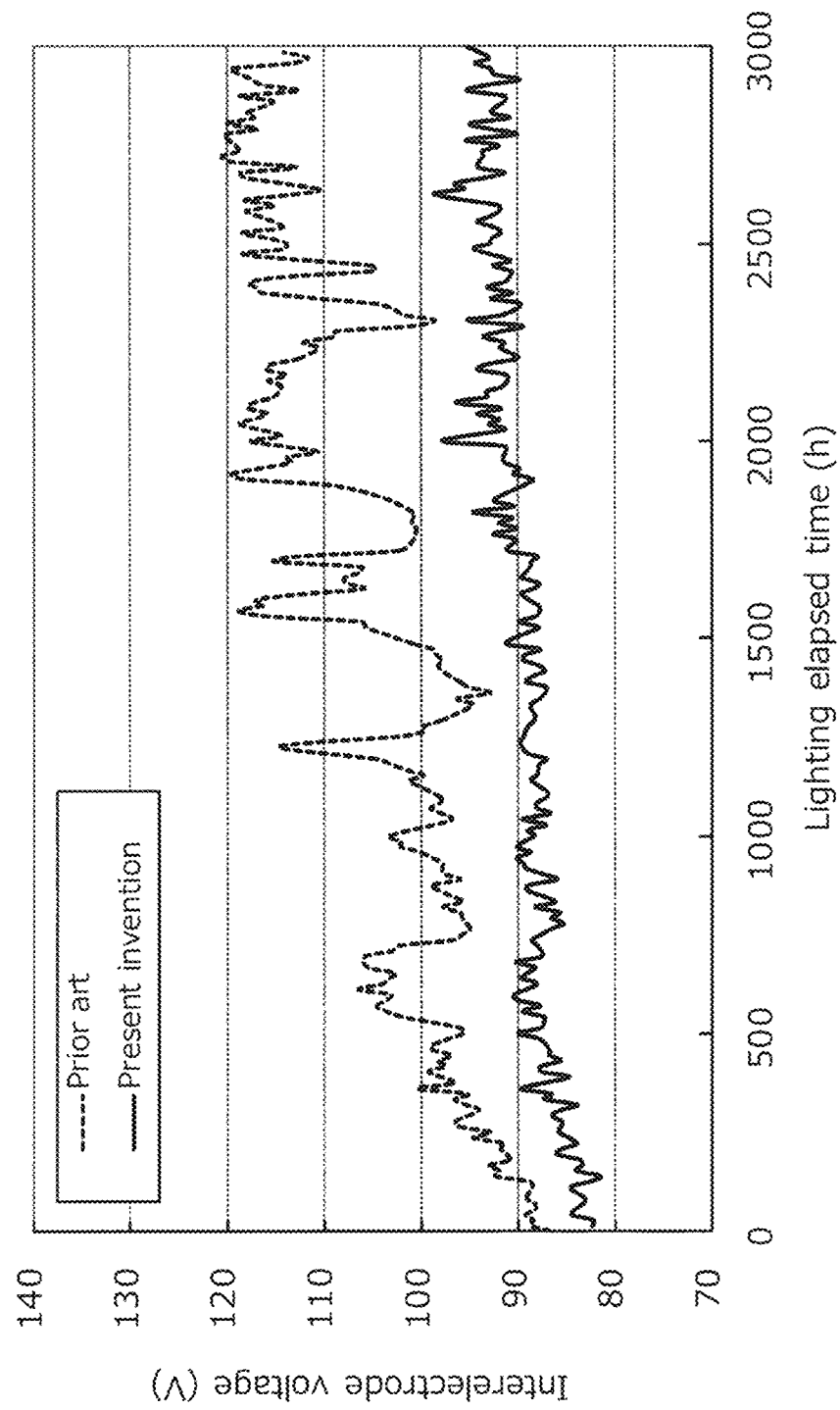
FIG. 8 is a graph obtained by comparing a change with time of an interelectrode voltage at the lighting time of the high-voltage discharge lamp respectively in the illumination device according to the present invention and the conventional illumination device.

FIG. 8 is a graph which compares a change with time of an interelectrode voltage at the lighting time of the high-voltage discharge lamp between the illumination device according to the present invention and the conventional illumination device. Specification of the lamps and lamp operation conditions will be shown below.
(Specification of Lamp)
Rated power: 450 W
Rated voltage: 85 V
Internal volume of light emitting part: 250 mm$^3$
Interelectrode distance: 1.5 mm
Sealed material: mercury 0.29 mg/mm$^3$, argon gas 13 kPa, halogen $10^{-6}$-$10^{-2}$ vol/mm$^3$
(Lamp Operation Condition)
Frequency of pulse wave P1: 370 Hz
Frequency of pulse wave P2: 90 Hz For the lamp acting condition, as described above, the illumination device according to the present invention outputs the pulse wave P3 having the frequency which is designated by the frequency rate to the pulse wave P2 per timing, in place of the pulse wave P2 at the predetermined timing (refer, for example, to FIGS. 4 and 7), in addition to the above. On the other hand, the conventional illumination device only repeats the cycles of the pulse waves P1 and P2 simply, without carrying out the process described above.

In FIG. 8, the horizontal axis indicates an elapsed time from the start of the lighting, and the vertical axis indicates an interelectrode voltage of the high-voltage discharge lamp. A result obtained by the illumination device according to the present invention is shown by a solid line, and a result obtained by the conventional illumination device is shown by a broken line.

The formation of the minute protrusions 23 and the movement of the protrusions 21 as the starting point of the arc 22 generate the discharge at a plurality of positions and make the discharge position unstable. The discharge at a plurality of positions causes the rising of the interelectrode voltage, and the movement of the protrusions 21 causes a vertically great fluctuation of the interelectrode voltage. In FIG. 8, the vertically great voltage fluctuation in the graph of the conventional example suggests the movement of the protrusions 21 at the time point.

According to FIG. 8, it is known that the interelectrode voltage of the high-voltage discharge lamp lighted by the illumination device according to the present invention comes to a lower voltage as a whole in comparison with that lighted by the conventional illumination device, and is suppressed its vertical fluctuation. As a result, it is understood that the effect of eliminating the minute protrusions while keeping the protrusion coming to the starting point of the arc can be obtained by the illumination device according to the present invention.

The distance outputting the pulse wave P3 having the further lower frequency in place of the pulse wave P2 is preferably set to 5 seconds or more and 300 seconds or less in the case of the time control, and set to 5 cycles or more and 5000 cycles or less in the case of the cycle number control. If the time interval outputting the pulse wave P3 is made too short, the protrusion 21 coming to the starting point of the arc is overheated, and there is a risk that the shape of the protrusion is deformed or is eliminated in some cases. On the contrary, if the time interval is made too long, there is a risk that the state in which the minute protrusions are formed at the position which is away from the protrusion 21 is maintained for a long time, or the effect of preventing the movement of the protrusion 21 cannot be obtained.

Other Embodiments

A description will be given below of other embodiments.
<1> The above embodiment described with reference to FIG. 3A is configured such that the pulse generation part 4 outputs the pulse wave P1 for the predetermined period T1, thereafter outputs the pulse wave P2 having the low frequency for the half cycle length T2, further outputs the pulse wave P1 for the time T1, and thereafter outputs the pulse wave P2 only the half cycle length T2 while changing the polarity from the preceding one. However, the output aspect of the pulse wave P2 is not limited to the aspect described above.

Figure 9A:
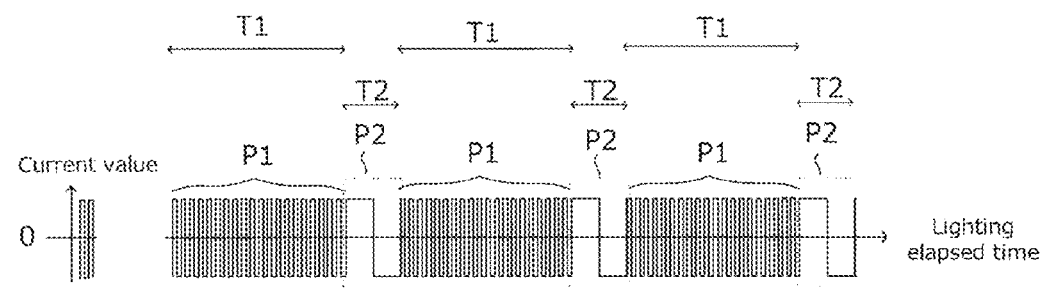
FIG. 9A is a view showing another example of the lamp current waveform of the high-voltage discharge lamp according to the present invention in a certain time zone.
Figure 9B:
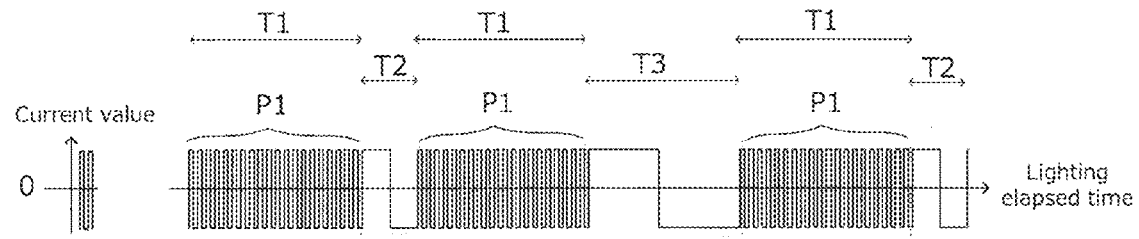
FIG. 9B is a view showing another example of the lamp current waveform of the high-voltage discharge lamp according to the present invention in another time zone.

For example, as shown in FIG. 9A, the pulse generation part 4 may repeat the cycle that it outputs the pulse wave T1 for the predetermined period T1, and thereafter outputs the pulse wave P2 having the low frequency for one cycle length T2. In this case, the pulse wave P3 for one cycle may be output in place of the pulse wave P2 for one cycle as shown in FIG. 9B, when the timing of outputting the pulse wave P3 arrives. Further, in this case, the pulse wave P3 inserted in place of the pulse wave P2 may be set for the time of the half cycle length, in the same manner as FIG. 3B.

Further, the pulse wave P2 having the low frequency included in the pulse signal output from the pulse generation part 4 may be configured to be included over the time equal to or longer than one cycle, for example, 1.5 cycle of the pulse wave P2. If the application time of the pulse wave P2 having the low frequency is extended too long, there is a risk that the electrode is overheated and the shape of the protrusion 21 coming to the arc starting point changes. Therefore, the pulse wave P2 having the low frequency is preferably kept within one period in one cycle.

<2> In the examples of FIGS. 4 and 7, the description is given on the assumption that the frequency of the pulse wave P3 output at the predetermined timing on the data table is designated by the rate to the frequency of the pulse wave P2. However, the value itself of the frequency to be output as the pulse wave P3 may be designated. Further, in these tables, there is shown the example in which the frequency of the pulse wave P3 at each of the timings increases little by little or decreases little by little, however, the changing aspect is not limited to this, but may employ an aspect changing at random. The numerical values indicated in FIGS. 4 and 7 are only one example, and the numerical values are not of course limited to these values.

<3> In the embodiment described above, the description is given on the assumption that the timing of changing the pulse wave P2 is fixed after continuously outputting the pulse wave P1, however, the timing of switching from the pulse wave P1 to the pulse wave P2 may be appropriately changed. As a result, it is possible to further change the area where the electrode is heated, and it is possible to further enhance the effect of keeping the shape of the protrusion optimum. In this case, it is preferable to increase or decrease the switch of the timing little by little for preventing the flickering of the lamp.

<4> In the embodiment described above, the description is given on the assumption that it comes back to the repeat of the output of the pulse wave P1 over the term T1 and the output of the pulse wave P2 over the term T2 again after the output of the pulse wave P3 in place of the pulse wave P2. In the case that the elapsed time from the start of the lighting becomes long, the pulse wave P1 about one period to two periods may be exceptionally inserted during the output of the pulse wave P3. This is given, for example, for the following purpose.

In the case that the AC/DC part 32 is configured by the full bridge inverter circuit as shown in FIG. 2, a power supply for driving the switches Q1 and Q4 on the high side is necessary. The power supply may employ, for example, a boot strap circuit, and a capacitor for boot strap (not shown) is charged when the switches Q1 and Q4 on the high side are in the off state. If a charging amount of the capacitor is insufficient, the switches Q1 and Q4 cannot be turned on due to the short of the power supply voltage. As a result, the pulse wave P1 about one period to two periods may be exceptionally inserted for the purpose of charging the capacitor.

The other purpose is for a case that the light source including the illumination device according to the present invention is used for a projector, for example, of DLP (registered trademark) system. In the projector of the DLP system, a control of reversing the polarity in response to the motion of the color wheel is normally carried out so as to prevent the displayed image from being adversely affected, and the capacitor is charged at the polarity reversing time. For the same reason described above, the pulse wave P1 between about one period and two periods may be exceptionally inserted for the purpose of charging the capacitor during the output of the pulse wave P3 in the case that the elapsed time from the start of the lighting becomes long and the charging amount to the capacitor is insufficient.

The content described in the other embodiment <4> is just configured to exceptionally output the pulse wave P1 for the short time during the output term of the pulse wave P3, and the polarity is not reversed during the output of the pulse wave P3 except the exceptional time. Therefore, it may be configured to come back to the repeat of the output of the pulse wave P1 over the term T1 and the output of the pulse wave P2 over the term T2, after the elapse of the output term of the pulse wave P3.

DESCRIPTION OF REFERENCE SIGNS

1: illumination device
3: power supply part
4: pulse generation part
10: high-voltage discharge lamp
11: light emitting part
12: sealing part
13: metal foil
14: external lead
20a, 20b: electrode
21: protrusion
22: discharge arc
23: minute protrusion
29a, 29b: head part of electrode
30a, 30b: shaft part of electrode
31: step-down chopper part
32: DC/AC conversion part
33: starter part
34: power control part
35: driver
41: pulse generation circuit
43: frequency control part
51: timing measurement part
52: memory part
53: frequency determination part
54: pulse count part

The invention claimed is:

1. A high-voltage discharge lamp illumination device configured to supply an AC current to a high-voltage discharge lamp which has a pair of electrodes arranged in an opposite manner in a discharge vessel with a predetermined gas sealed, the high-voltage discharge lamp illumination device comprising:
a pulse generation part which generates pulse waves; and
a power supply part which receives a DC voltage and converts the DC voltage into the AC current in correspondence to a frequency of the pulse waves so as to supply the AC current to the high-voltage discharge lamp, wherein
the pulse generation part repeats a cycle of outputting a first pulse wave over a first period, and thereafter outputting a second pulse wave having a lower frequency than the first pulse wave over a second period shorter than the first period, and
the pulse generation part returns to the cycle after outputting a third pulse wave having a frequency which is further lower than the second pulse wave in place of the second pulse wave, at a predetermined timing, and
the third pulse wave is changed its frequency in response to the predetermined timing.

2. The high-voltage discharge lamp illumination device according to claim 1, wherein the pulse generation part outputs the third pulse wave in place of the second pulse wave by detecting arrival of the predetermined timing in response to an elapsed time after starting the output of the pulse waves.

3. The high-voltage discharge lamp illumination device according to claim 1, wherein the pulse generation part outputs the third pulse wave in place of the second pulse wave by detecting arrival of the predetermined timing in response to the number of the cycle repeated after starting the output of the pulse waves.

4. The high-voltage discharge lamp illumination device according to claim 1, further comprising a frequency control part which adjusts a frequency of the pulse waves, wherein the frequency control part
repeats a control of setting a first frequency which is a frequency of the first pulse wave over the first period and continuously setting a second frequency which is a frequency of the second pulse wave over the second period, and
carries out a control of setting the third frequency in place of the second frequency in the case of detecting arrival of the predetermined timing on the basis of an elapsed time after starting the output of the pulse waves or a switching number of the first period and the second period.

* * * * *